United States Patent
Chen (10) Patent No.: US 12,483,142 B2
(45) Date of Patent: Nov. 25, 2025

(54) QUASI-RESONANT CONTROLLED SWITCHING POWER SUPPLY WITH AN ADAPTIVE UPPER LIMIT OF VALLEY NUMBER

(71) Applicant: Chengdu Monolithic Power Systems Co., Ltd., Chengdu (CN)

(72) Inventor: Xuefeng Chen, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 200 days.

(21) Appl. No.: 18/514,404

(22) Filed: Nov. 20, 2023

(65) Prior Publication Data
US 2024/0204657 A1    Jun. 20, 2024

(30) Foreign Application Priority Data
Dec. 15, 2022   (CN) .......................... 202211626128.X (51) Int. Cl.
*H02M 3/335* (2006.01)
*H02M 1/00* (2006.01)
*H02M 3/00* (2006.01)

(52) U.S. Cl.
CPC ..... *H02M 3/33507* (2013.01); *H02M 1/0054* (2021.05); *H02M 1/0058* (2021.05); *H02M 3/01* (2021.05); *H02M 1/0025* (2021.05); *H02M 1/0032* (2021.05); *H02M 3/33523* (2013.01)

(58) Field of Classification Search
CPC ............ H02M 1/0025; H02M 1/0032; H02M 1/0054; H02M 1/0058; H02M 3/01; H02M 3/335; H02M 3/33507
See application file for complete search history.

(56) References Cited

U.S. PATENT DOCUMENTS

| | | | |
|---|---|---|---|
| 10,673,322 B1* | 6/2020 | Giombanco | H02M 1/4225 |
| 11,557,960 B1* | 1/2023 | Twelkemeijer | H02M 1/083 |
| 2007/0121352 A1* | 5/2007 | Yang | H02M 3/33523 363/21.15 |
| 2011/0149614 A1* | 6/2011 | Stracquadaini | H02M 3/33507 29/602.1 |
| 2014/0218978 A1* | 8/2014 | Heuken | H05B 45/385 363/21.16 |
| 2016/0241150 A1* | 8/2016 | Hsu | H02M 1/08 |
| 2017/0047846 A1* | 2/2017 | Teo | H02M 3/33507 |
| 2022/0103078 A1 | 3/2022 | Fan et al. | |
| 2022/0209665 A1 | 6/2022 | Li et al. | |

(Continued)

*Primary Examiner* — Gary L Laxton
(74) *Attorney, Agent, or Firm* — Perkins Coie LLP (57) ABSTRACT

A controller used in a switching power supply having a power switch and an energy storage element. A winding voltage of the energy storage element oscillates to provide an oscillation signal having one or more valleys during an OFF period of the power switch. The controller has a target valley number generator for providing a target locked valley number which is not exceeding an upper limit, a first comparison circuit for providing a first square wave signal by comparing a voltage sensing signal representative of the oscillation signal with a first threshold voltage, a second comparison circuit for providing a second square wave signal by comparing the voltage sensing signal with a second threshold voltage less than the first threshold voltage, and an upper limit updating circuit to determine if to update the upper limit.

20 Claims, 8 Drawing Sheets

(56) References Cited

U.S. PATENT DOCUMENTS

| | | |
|---|---|---|
| 2022/0209676 A1 | 6/2022 | Li et al. |
| 2022/0393603 A1 | 12/2022 | Chen |
| 2023/0188033 A1 | 6/2023 | Chen et al. |
| 2023/0188046 A1 | 6/2023 | Chen et al. |

* cited by examiner

QUASI-RESONANT CONTROLLED SWITCHING POWER SUPPLY WITH AN ADAPTIVE UPPER LIMIT OF VALLEY NUMBER

CROSS-REFERENCE TO RELATED APPLICATIONS

This application claims the benefit of CN application 202211626128.X, filed on Dec. 15, 2022, and incorporated herein by reference.

TECHNICAL FIELD OF THE INVENTION

The present invention generally relates to electronic circuits, and more particularly but not exclusively, to quasi-resonant controlled switching power supplies with an adaptive upper limit of valley number and associated control methods.

BACKGROUND OF THE INVENTION

Quasi-resonant flyback converters are extensively used in low power applications. In the quasi-resonant control, a flyback converter operates in a boundary condition mode (BCM). When a current passing through an energy storage component of the flyback converter lowers to zero, the parasitic capacitance of the energy storage component and the power switch starts to resonate. The power switch (e.g., a primary switch of the flyback converter) is turned on when the resonant voltage across the power switch has the minimum voltage level (i.e., valley switching), in order to reduce the switching loss of the flyback converter.

SUMMARY OF THE INVENTION

An embodiment of the present invention discloses a controller used in a switching power supply. The switching power supply has a power switch and an energy storage element coupled to the power switch. A winding voltage of the energy storage element oscillates to provide an oscillation signal having one or more valleys during an OFF period of the power switch. The controller has a target valley number generator, a first comparison circuit, a second comparison circuit and an upper limit updating circuit. The target valley number generator provides a target locked valley number corresponding to a valley switching of the power switch. The target locked valley number will not exceed an upper limit stored in a register. The first comparison circuit compares a voltage sensing signal representative of the oscillation signal with a first threshold voltage during the OFF period of the power switch to provide a first square wave signal. The second comparison circuit compares the voltage sensing signal with a second threshold voltage during the OFF period of the power switch to provide a second square wave signal. The second threshold voltage is less than the first threshold voltage. The upper limit updating circuit determines if to update the upper limit based on the first square wave signal and the second square wave signal.

Another embodiment of the present invention discloses a switching power supply. The switching power supply has a power switch, an energy storage element coupled to the power switch, and a controller. A winding voltage of the energy storage element oscillates to provide an oscillation signal having one or more valleys during an OFF period of the power switch. The controller has a target valley number generator, a first comparison circuit, a second comparison circuit and an upper limit updating circuit. The target valley number generator provides a target locked valley number corresponding to a valley switching of the power switch. The target locked valley number will not exceed an upper limit stored in a register. The first comparison circuit compares a voltage sensing signal representative of the oscillation signal with a first threshold voltage during the OFF period of the power switch to provide a first square wave signal. The second comparison circuit compares the voltage sensing signal with a second threshold voltage during the OFF period of the power switch to provide a second square wave signal. The second threshold voltage is less than the first threshold voltage. The upper limit updating circuit determines if to update the upper limit based on the first square wave signal and the second square wave signal.

Yet another embodiment of the present invention discloses a control method used in a switching power supply. The switching power supply has a power switch and an energy storage element coupled to the power switch. A winding voltage of the energy storage element oscillates to provide an oscillation signal having one or more valleys during an OFF period of the power switch. The control method has the following steps. A target locked valley number corresponding to a valley switching of the power switch is provided. The target locked valley number will not exceed an upper limit stored in a register. A voltage sensing signal representative of the oscillation signal is compared with a first threshold voltage during the OFF period of the power switch, to provide a first square wave signal. The voltage sensing signal is compared with a second threshold voltage during the OFF period of the power switch, to provide a second square wave signal. The second threshold voltage is less than the first threshold voltage. Based on the first square wave signal and the second square wave signal, if to update the upper limit is determined.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
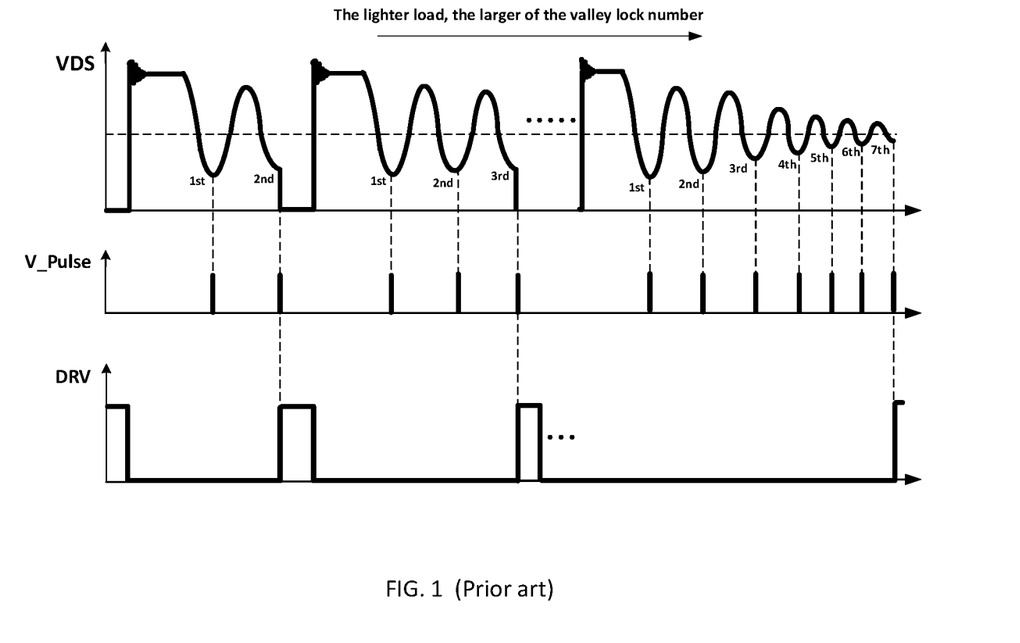
FIG. 1 is an operation waveform diagram of a flyback converter.

FIG. 1 is an operation waveform diagram of a flyback converter. As shown in FIG. 1, in a quasi-resonant control, when the load becomes light, the flyback converter will reduce the switching frequency, and increase the number of valleys in which a power switch at a primary side is turned on cycle by cycle, to improve the conversion efficiency. Apparently, as the valley number increases, the oscillating amplitude of a voltage VDS across the power switch will attenuate. In order to take full advantage of the oscillating voltage during an OFF period of the power switch, an upper limit of the valley number is set as large as possible, e.g., the upper limit is set to be 7 as shown in FIG. 1. However, when the load becomes lighter, the oscillation amplitude of the voltage VDS attenuates greatly, and the last valley cannot be accurately detected, which will cause the system to work unstable. Therefore, how much the upper limit of the valley number should be set, that is, how many valley numbers should be locked at most before the power switch can be turned on, has become a problem that the present invention intends to solve. The current method of using a fixed upper limit of the valley number is obviously not a good solution, because it is difficult to adapt to various working conditions.

Figure 2:
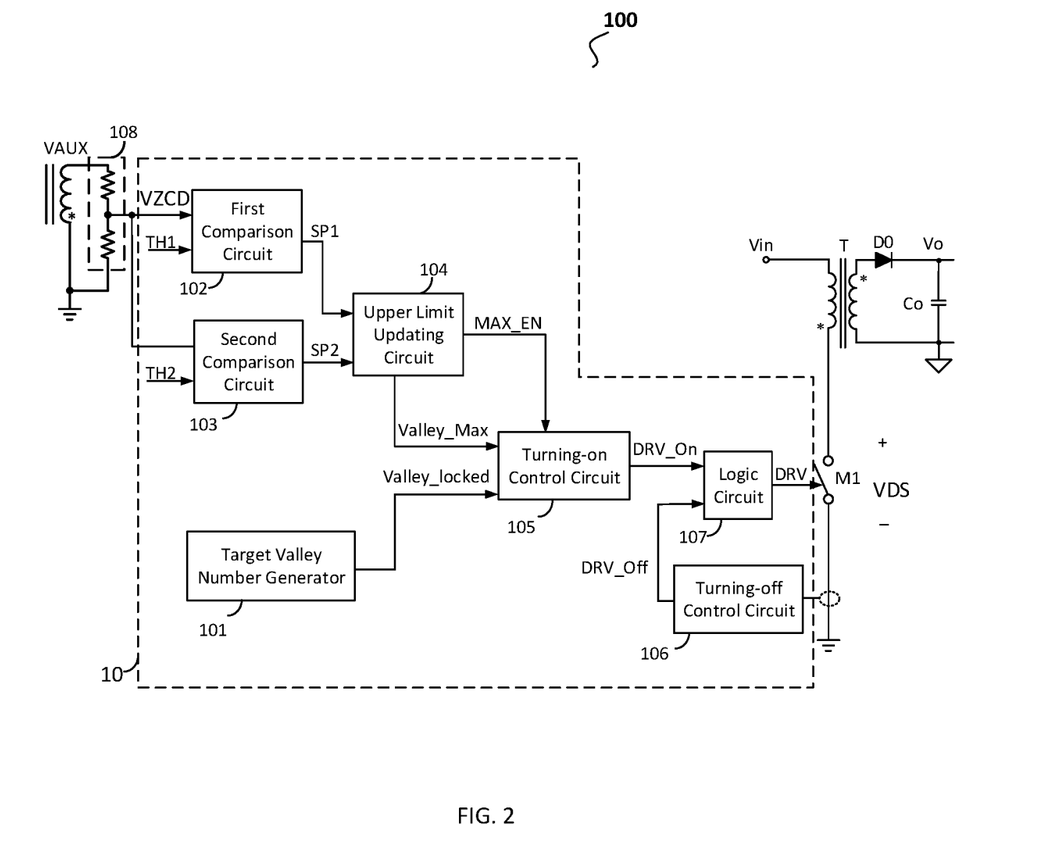
FIG. 2 is a circuit diagram of a quasi-resonant controlled switching power supply 100 in accordance with an embodiment of the present invention.

FIG. 2 is a circuit diagram of a quasi-resonant controlled switching power supply 100 in accordance with an embodiment of the present invention. As shown in FIG. 2, the switching power supply 100 comprises a transformer T, a power switch M1 coupled to a primary winding of the transformer T, a diode DO coupled to a secondary winding of the transformer T, an output capacitor Co, and a controller 10. The controller 10 is coupled to the power switch M1, is configured to provide a control signal DRV of the power switch M1. As the power switch M1 is turned on and off alternatively, the transformer T stores and outputs energy, and converts an input voltage Vin into an output voltage Vo for the load. The power switch M1 can adopt any suitable type of switch, such as MOS transistor, SiC, GaN and so on.

As shown in FIG. 2, the controller 10 comprises a target valley number generator 101, a first comparison circuit 102, a second comparison circuit 103, an upper limit updating circuit 104, a turning-on control circuit 105, a turning-off control circuit 106 and a logic circuit 107.

In one embodiment, the switching power supply 100 further comprises a plurality of detection circuits. The plurality of detection circuits may include a winding voltage detection unit for detecting an auxiliary winding voltage VAUX across an auxiliary winding of the transformer T, a switching voltage sampling unit for detecting a voltage VDS across the power switch M1, a current sensing unit to sense a current flowing through the power switch M1, an output voltage sensing circuit, etc. The plurality of detection circuits can be realized by known units in the prior art. To clarify the description, detailed descriptions of these known units and their functions are omitted here.

In the embodiment shown in FIG. 2, the target valley number generator 101 is configured to provide a target locked valley number Valley_lock which is corresponding to a valley switching of the power switch M1. The target locked valley number Valley_lock will not exceed an upper limit Valley_Max stored in a register and will not be less than a lower limit. Generally, the lower limit has a fixed value, i.e., 0. When the target locked valley number Valley_lock is equal to the lower limit (e.g., 0), the switching power supply 100 works in a current continuous mode. When the target locked valley number Valley_lock is greater than 0, the switching power supply 100 works in a current discontinuous mode. The upper limit Valley_Max is stored in the register, and the upper limit updating circuit 104 is configured to determine whether to update the upper limit Valley_Max. In one embodiment, the upper limit Valley_Max of the target locked valley number Valley_lock is adjusted to 7, which means that the target lock valley number Valley_lock is not greater than 7 and not less than 0. In another embodiment, the upper limit Valley_Max of the target locked valley number Valley_lock is adjusted to 6, which means that the target locked valley number Valley_lock is not greater than 6 and not less than 0.

In the embodiment shown in FIG. 2, during the OFF period of the power switch M1, the winding voltage VAUX across the auxiliary winding oscillates to provide an oscillation signal having one or more valleys. As shown in FIG. 2, a voltage divider 108 has an input terminal and an output terminal, wherein the input terminal is configured to receive the winding voltage VAUX, and the output terminal is configured to output a voltage sensing signal VZCD representative of the oscillation signal. In another embodiment, the oscillation signal may comprise a voltage VDS across the power switch M1 during the OFF period of the power switch M1.

In the example shown in FIG. 2, the first comparison circuit 102 is configured to compare the voltage sensing signal VZCD representative of the oscillation signal with a first threshold voltage TH1 during the OFF period of the power switch M1, to provide a first square wave signal SP1 at an output terminal. The second comparison circuit 103 is configured to compare the voltage sensing signal VZCD with a second threshold voltage TH2 during the OFF period of the power switch M1, to provide a second square wave signal SP2. The second threshold voltage TH2 is less than the first threshold voltage TH1. In one embodiment, the second threshold voltage TH2 is 0 or close to 0. The upper limit updating circuit 104 has a first input terminal, a second input terminal and an output terminal, wherein the first input terminal is configured to receive the first square wave signal SP1, the second input terminal is configured to receive the second square wave signal SP2, based on the first square wave signal SP1 and the second square wave signal SP2, the upper limit updating circuit 104 is configured to determine if to update the upper limit Valley_Max.

In a further embodiment, the upper limit updating circuit 104 is further configured to provide an upper limit enable signal MAX_EN. Once the power switch M1 is turned off and the transformer T completes demagnetization, the voltage VDS across the power switch M1 starts to oscillate and generates the oscillation signal having at least one valley. In one embodiment, the oscillation signal comprises the voltage VDS across the power switch M1 after the demagnetization during the OFF period of the power switch M1. In another embodiment, the oscillation signal comprises the winding voltage VAUX across the auxiliary winding after the demagnetization ends. The upper limit updating circuit 104 counts the number of the valleys of the oscillation signal in each switching cycle, and when the counted number exceeds the upper limit Valley_Max, the upper limit enable signal MAX_EN is enabled.

The turning-on control circuit 105 is configured to provide a turning-on control signal DRV_On based on the operation of the switching power supply 100. When the turning-on control signal DRV_On is enabled, the power switch M1 is controlled to be turned on. In detail, when the target locked valley number Valley_lock, the upper limit Valley_Max and the upper limit enable signal MAX_EN meet the predetermined conditions, the turning-on control signal DRV_On is enabled, and the logic circuit 107 outputs the control signal DRV to turn on the power switch M1. In one embodiment, the predetermined conditions may be that the upper limit enable signal MAX_EN is disabled, and the power switch M1 is turned on at the valley corresponding to the target locked valley number Valley_lock. In another embodiment, the predetermined conditions may be that the upper limit enable signal MAX_EN is enabled, and the power switch M1 is turned on at the valley corresponding to the updated upper limit Valley_MAX. In yet another embodiment, the predetermined condition may be that when the upper limit enable signal MAX_EN is enabled, the power switch M1 is turned on immediately, without waiting for the next valley to appear.

In the embodiment shown in FIG. 2, when the turning-on control signal DRV_On is enabled, the power switch M1 is turned on under the control of the control signal DRV, the primary winding of the transformer T starts to store the energy. When the current flowing through the power switch M1 increases to a feedback threshold voltage representative of the output voltage Vo, the turning-off control circuit 106 provides a turning-off control signal DRV_Off, and thus the power switch M1 is turned off under the control of the control signal DRV, and the energy stored in the primary winding is transferred to the secondary winding. In one embodiment, the logic circuit 107 has a set terminal, a reset terminal and an output terminal, wherein the set terminal is coupled to the output terminal of the turning-on control circuit 105 to receive the turning-on control signal DRV_On, the reset terminal is coupled to the output terminal of the turning-off control circuit 106 to receive the turning-off control signal DRV_Off, based on the turning-on control signal DRV_On and the turning-off control signal DRV_Off, the logic circuit 107 provides the control signal DRV on the output terminal for control the turning-on and turning-off of the power switch M1.

Figure 3:
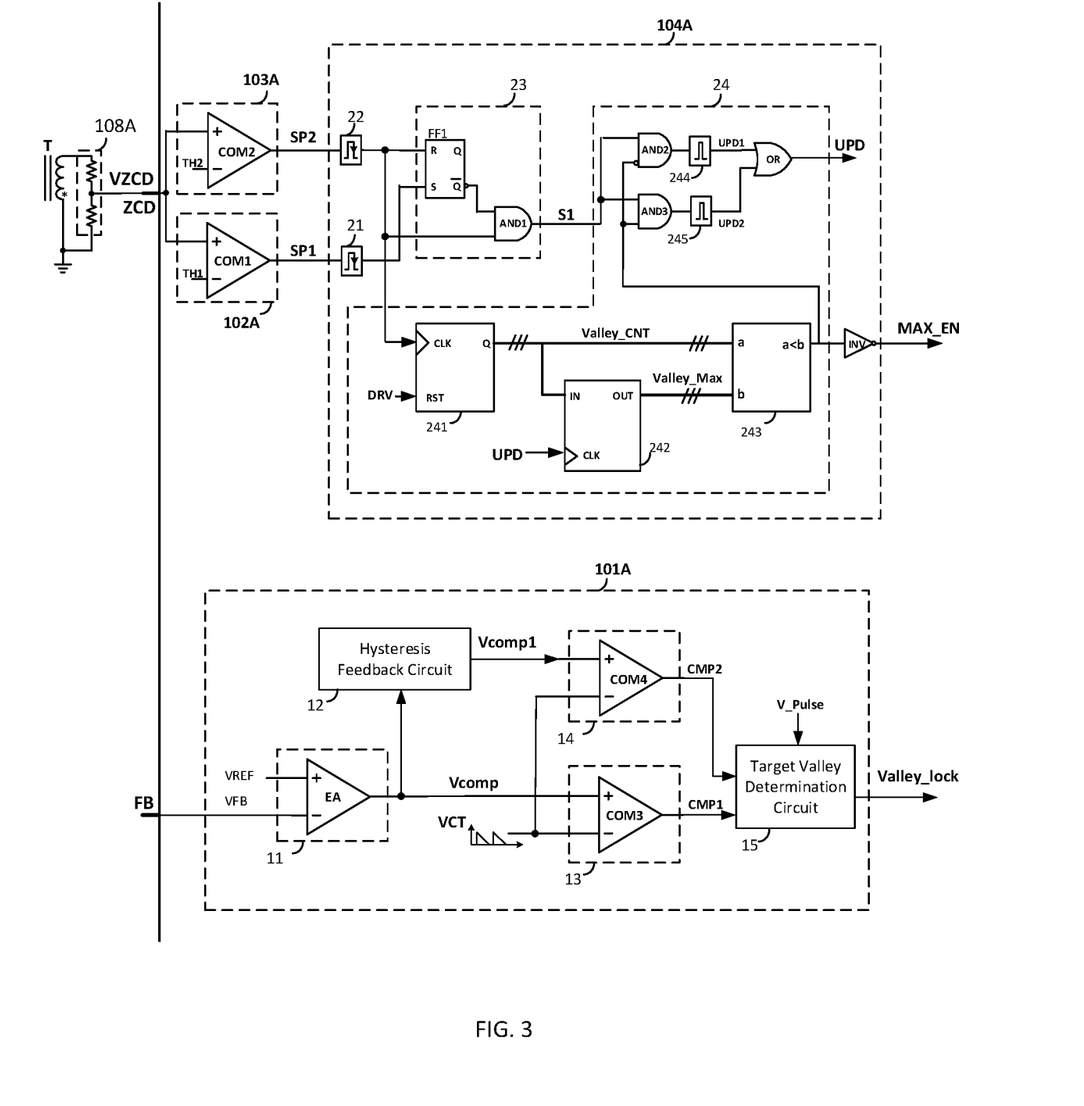
FIG. 3 is a circuit diagram of a controller used in the switching power supply 100 shown in FIG. 2 in accordance with an embodiment of the present invention.

FIG. 3 is a circuit diagram of a controller used in the switching power supply 100 shown in FIG. 2 in accordance with an embodiment of the present invention. The controller 10A is an integrated circuit, and comprises a plurality of pins. The plurality of pins at least comprises a sensing pin ZCD and a feedback pin FB. As shown in FIG. 3, the controller 10A comprises a target valley number generator 101A, a first comparison circuit 102A, a second comparison circuit 103A and an upper limit updating circuit 104A. To clarify the description, detailed descriptions to a turning-on control circuit, a turning-off control circuit and a logic circuit and their functions are omitted here.

In the embodiment of FIG. 3, the target valley number generator 101A is configured to provide a target locked valley number Valley_lock corresponding to a valley switching of the power switch M1. The target valley number generator 101A comprises an output feedback circuit 11, a hysteresis feedback circuit 12, a third comparison circuit 13, a third comparison circuit 14 and a target valley determination circuit 15. The target valley number generator 101A described here is only for illustration, not for limiting the present invention.

As shown in FIG. 3, the output feedback circuit 11 is coupled to a feedback pin FB to receive a feedback signal VFB indicative of an output signal of the switching power supply 100 and to generate an output feedback signal Vcomp based on a difference between the feedback signal VFB and a reference voltage VREF. In the example shown in FIG. 3, the output feedback circuit 11 comprises an error amplifier EA. The error amplifier EA has a non-inverting input terminal, an inverting input terminal and an output terminal, wherein the inverting input terminal receives the feedback signal VFB, the non-inverting input terminal receives the reference voltage VREF, and the output terminal provides the output feedback signal Vcomp.

The hysteresis feedback circuit 12 has an input terminal coupled to the output feedback circuit 11 to receive the output feedback signal Vcomp, and an output terminal for outputting a hysteresis feedback signal Vcomp1. In one embodiment, the hysteresis feedback circuit 12 is configured to provide a first hysteresis voltage VHys based on the output feedback signal Vcomp, and the hysteresis feedback signal Vcomp1=Vcomp+VHys. In another embodiment, the hysteresis feedback signal Vcomp1=Vcomp−VHys. In yet another embodiment, the hysteresis feedback signal Vcomp1=K*Vcomp. Wherein K is a proportional coefficient less than 1, which is related to the output feedback signal Vcomp.

In the example shown in FIG. 3, the third comparison circuit 13 is coupled to the output feedback circuit 11, to compare the output feedback signal Vcomp with a ramp signal VCT, to provide a first comparison signal CMP1 at an output terminal. The fourth comparison circuit 14 is coupled to the hysteresis feedback circuit 12, to compare the hysteresis feedback signal Vcomp1 with the ramp signal VCT, to provide a second comparison signal CMP2 at an output terminal. In one embodiment, the third comparison circuit 12 comprises a comparator COM3. The non-inverting input terminal of the comparator CMP3 is coupled to the output feedback circuit 11 for receiving the output feedback signal Vcomp, the inverting input terminal of the comparator CMP3 is coupled to receive the ramp signal VCT, the output terminal is configured to provide the first comparison signal CMP1. The fourth comparison circuit 14 comprises a comparator COM4. The non-inverting input terminal of the comparator CMP4 is coupled to the hysteresis feedback circuit 12 for receiving the hysteresis feedback signal Vcomp1, the inverting input terminal of the comparator CMP4 is coupled to receive the ramp signal VCT, the output terminal is configured to provide the second comparison signal CMP2.

The target valley determination circuit 15 has a first input terminal, a second input terminal, a third input terminal and an output terminal. wherein the first input terminal is coupled to the third comparison circuit 13 to receive a first comparison signal CMP1, the second input terminal is coupled to the fourth comparison circuit 14 to receive a second comparison signal CMP2, the third input terminal is configured to receive a valley pulse signal V_Pulse which is corresponding to the one or more valleys of the oscillation signal. Based on the first comparison signal CMP1, the second comparison signal CMP2 and the current locked valley number, the target valley determination circuit 15 is configured to determine the target locked valley number Valley_lock for determining the next turning-on of the power switch M1.

In one embodiment, the target valley determination circuit 15 is configured to determine whether to increase the target locked valley number Valley_lock by comparing a first designated valley number when the ramp signal reaches the output feedback signal Vcomp with the current locked valley number. In a further embodiment, the target valley determination circuit 15 is configured to determine whether to decrease the target locked valley number Valley_lock by comparing a difference between a second designated valley number and the current locked valley number with a predetermined value m, and wherein the second designated valley number is the valley number when the ramp signal VCT reaches the hysteresis feedback signal Vcomp1 and the predetermined value m is an integer number greater than 1.

In one embodiment, the oscillation signal comprises a voltage VDS across the power switch M1 after the demagnetization during the OFF period of the power switch M1, and the voltage sensing signal is related to the voltage VDS. During the OFF period of the power switch M1, if the voltage VDS is less than a valley reference signal is detected, and the valley pulse signal V_Pulse is provided based on the detection result. When the voltage VDS is greater than the valley reference signal, the valley pulse signal V_Pulse is at a first level, and when the voltage VDS is less than and equal to the valley reference signal, the valley pulse signal V_Pulse is at a second level.

In one embodiment, the oscillation signal comprises a winding voltage VAUX across the auxiliary winding after the demagnetization ends which is converted to the voltage sensing signal via the voltage divider 108. During the OFF period of the power switch M1, if the winding voltage VAUX is less than a valley reference signal is detected, and the valley pulse signal V_Pulse is provided based on the detection result. An embodiment of the target valley number generator 101A will be described below with reference to FIG. 4.

Figure 4:
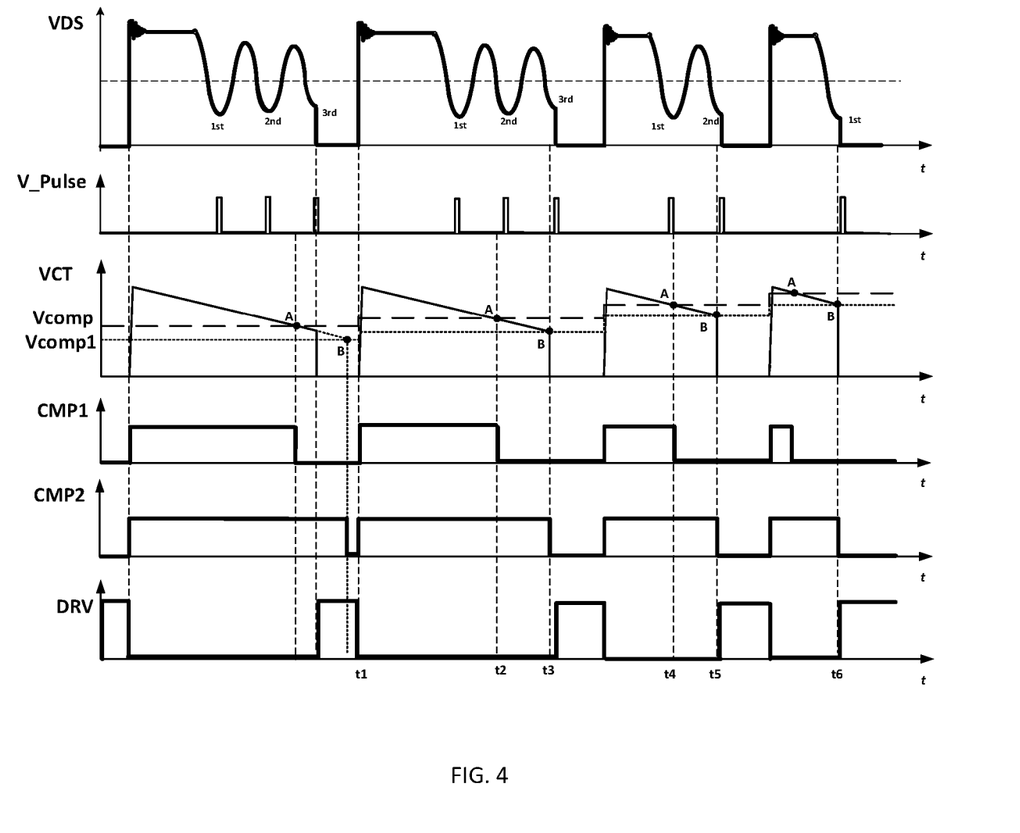
FIG. 4 is an operation waveform diagram of the switching power supply 100 in accordance with an embodiment of the present invention.

FIG. 4 is an operation waveform diagram of the switching power supply 100 in accordance with an embodiment of the present invention. As shown in FIG. 4, at time t1, the current locked valley number is 3. At time t2, the first designated valley number when the ramp signal VCT decreases to reach the output feedback signal Vcomp (shown as a point A) is 1, the target locked valley number Valley_lock would not increase and keeps the value of the current locked valley number. At time t3, the second designated valley number when the ramp signal VCT decreases to reach the hysteresis feedback signal Vcomp1 (shown as a point B) is 2, and the difference between the current locked valley number and the second designated valley number is less than the predetermined value (e.g., 2), the target locked valley number Valley_lock would not increase and keeps the value of the current locked valley number.

At time t4, the first designated valley number (shown as the point A) when the ramp signal VCT decreases to the output feedback signal Vcomp is 1, the target locked valley number Valley_lock would not increase. At time t5, the second designated valley number (shown as the point B) when the ramp signal VCT decreases to the hysteresis feedback signal Vcomp1 is 1, and the difference between the current locked valley number and the second designated valley number is equal to the predetermined value 2, the target locked valley number Valley_lock will decrease to 2.

Although the embodiment shown in FIG. 4 is only for illustration and introduction of a generation mechanism of the target lock valley number Valley_lock, and those skilled in the art should understand that embodiments using other valley lock mechanisms can also be applied to the present invention.

Referring now to FIG. 3, the voltage divider circuit 108A has an input terminal and an output terminal, wherein the input terminal is coupled to the auxiliary winding of the transformer T to receive an oscillation signal having at least one valley when the auxiliary winding voltage VAUX oscillates, and the output terminal provides the voltage sensing signal VZCD representative of the oscillation signal. The first comparison circuit 102A is coupled to the detection pin ZCD to receive the voltage sensing signal VZCD. The first comparison circuit 102A compares the voltage sensing signal VZCD with a first threshold voltage TH1 during the OFF period of the power switch M1 to generate a first square wave signal SP1 at the output terminal based on the comparison result. In the example shown in FIG. 3, the first comparison circuit 102A comprises a comparator COM1. The non-inverting input terminal of the comparator COM1 is coupled to the detection pin ZCD to receive the voltage sensing signal VZCD, the inverting input terminal of the comparator COM1 receives the first threshold voltage TH1, and the output terminal generates the first square wave signal SP1. Whenever the voltage sensing signal VZCD decreases to the first threshold voltage TH1, the first square wave signal SP1 provides a falling edge.

The second comparison circuit 103A is configured to receive the voltage sensing signal VZCD, compares the voltage sensing signal VZCD with the second threshold voltage TH2, and generates a second square wave signal SP2 at the output terminal based on the comparison result. The second threshold voltage TH2 is less than the first threshold voltage TH1. In one embodiment, the second comparison circuit 103A comprises a comparator COM2. The non-inverting input terminal of the comparator COM2 is coupled to the detection pin ZCD to receive the voltage sensing signal VZCD, the inverting input terminal of the comparator COM2 receives the second threshold voltage TH2, and the second square wave signal SP2 is generated at the output terminal. Whenever the voltage sensing signal VZCD decreases to the second threshold voltage TH2, the second square wave signal SP2 provides a falling edge.

In the example shown in FIG. 3, the upper limit updating circuit 104A comprises a first falling-edge trigger circuit 21, a second falling-edge trigger circuit 22, a first determination circuit 23 and a second determination circuit 24. The first falling-edge trigger circuit 21 generates one pulse at each falling edge of the first square wave signal SP1 to provide a first pulse signal. The second falling-edge trigger circuit 22 generates one pulse at each falling edge of the second square wave signal SP2 to provide a second pulse signal.

The first determination circuit 23 is configured to compare the number of pulses of the second pulse signal with the number of pulses of the first pulse signal, to generate a first determination signal S1. If the number of pulses of the second pulse signal is greater than the number of pulses of the first pulse signal, the first determination signal S1 is enabled. If the number of pulses of the second pulse signal is equal to the number of pulses of the first pulse signal, the first determination signal S1 is disabled. In the example shown in FIG. 3, the first determination circuit 23 comprises a flip-flop FF1 and a first AND gate circuit AND1. The first determination circuit 23 is only an example for the purpose of illustration, which is not intended to limit the present invention. The first determination circuit 23 may adopt other circuits to determine whether the number of pulses of the second pulse signal is greater than the number of pulses of the first pulse signal. For example, two counters are used to count the number of pulses of the first pulse signal and the second pulse signal respectively, and the counting results are compared, and the first determination signal S1 is generated based on the comparison result.

The second determination circuit 24 is configured to compare the number of pulses of the second pulse signal with the upper limit Valley_Max. Based on the comparison result together with the first determination signal S1, an updating indication signal UPD is provided at the output terminal. The second determination circuit 24 comprises a counter 241, a register 242, a digital comparison circuit 243, a second AND gate circuit AND2, a third AND gate circuit AND3, a first one-pulse circuit 244, a second one-pulse circuit 245 and an OR gate circuit OR.

As shown in FIG. 3, the counter 241 is coupled to the output terminal of the second falling-edge trigger circuit 22 to receive the second pulse signal to count the number of pulses of the second pulse signal. The counter 241 has a clock input terminal CLK, a reset terminal RST and an output terminal, wherein the clock input terminal CLK receives the second pulse signal, the reset terminal RST receives the control signal DRV, and the output terminal provides a valley count Valley_CNT. When the power switch M1 is turned on, the counter 241 will be reset, and the valley count Valley_CNT will be 0. During the demagnetization period, the voltage VDS across the power switch M1 is clamped to a constant at the beginning of the OFF period of the power switch M1, and the voltage sensing signal VZCD is also clamped accordingly. The voltage VDS across the power switch M1 starts to oscillate after the demagnetization ends. Whenever the voltage sensing signal VZCD decreases below the second threshold voltage TH2, the second square wave signal SP2 provides a falling edge. The second falling-edge trigger 22 generates one pulse at each falling edge, to provide the second pulse signal at the output terminal to the clock input terminal CLK of the counter 241, and thus the counter 241 starts to count, and the current valley count Valley_CNT increases by 1, that is, the number of pulses of the second pulse signal increases by 1.

The register 242 is configured to store the upper limit Valley_Max of the target lock valley number Valley_lock. The register 242 has an input terminal, a clock terminal and an output terminal, wherein the input terminal receives the valley count Valley_CNT, the clock terminal receives the updating indication signal UPD, and the output terminal provides the updated upper limit Valley_Max. The digital comparison circuit 243 has a first input terminal, a second input terminal and an output terminal, wherein the first input terminal is coupled to the output terminal of the counter 241 to receive the valley count Valley_CNT, and the second input terminal is coupled to the output terminal of the register 242 to receive the upper limit Valley_Max. The second AND gate circuit AND2 has a first input terminal, a second inverting input terminal and an output terminal, wherein the first input terminal is coupled to the output terminal of the first determination circuit 23 to receive the first determination signal S1, and the second inverting input terminal is coupled to the output terminal of the digital comparison circuit 243. The input terminal of the first one-pulse circuit 244 is coupled to the output terminal of the second AND gate circuit AND2, and the output terminal provides the first updating indication signal UPD1. When the first determination signal S1 is enabled and the number of pulses of the second pulse signal is greater than the upper limit Valley_Max, the first updating indication signal UPD1 is enabled.

The third AND gate circuit AND3 has a first input terminal, a second input terminal and an output terminal, wherein the first input terminal is coupled to the output terminal of the first determination circuit 23 to receive the first determination signal S1, and the second input terminal is coupled to the output terminal of the digital comparison circuit 243. The second one-pulse circuit 245 is coupled to the output terminal of the third AND circuit AND3 to provide the second updating indication signal UPD2 at the output terminal. Wherein when the first determination signal S1 is enabled and the number of pulses of the second pulse signal is less than the upper limit Valley_Max, the second updating indication signal UPD2 is enabled. The OR gate circuit OR has a first input terminal, a second input terminal and an output terminal, wherein the first input terminal receives the first updating indication signal UPD1, the second input terminal receives the second updating indication signal UPD2, and the output terminal provides the updating indication signal UPD. Wherein when the update indicating signal UPD is enabled, the upper limit Valley_Max stored in the register 242 is updated to be the number of pulses of the second pulse signal, that is, the current valley count Valley_CNT.

In a further embodiment, the digital comparison circuit 243 together with an inverter INV, is configured compare the number of pulses of the second pulse signal with the upper limit Valley_Max, and when the number of pulses of the second pulse signal reaches the upper limit Valley_Max, the upper limit enable signal MAX_EN is generated at an output terminal of the inverter INV.

Figure 5:
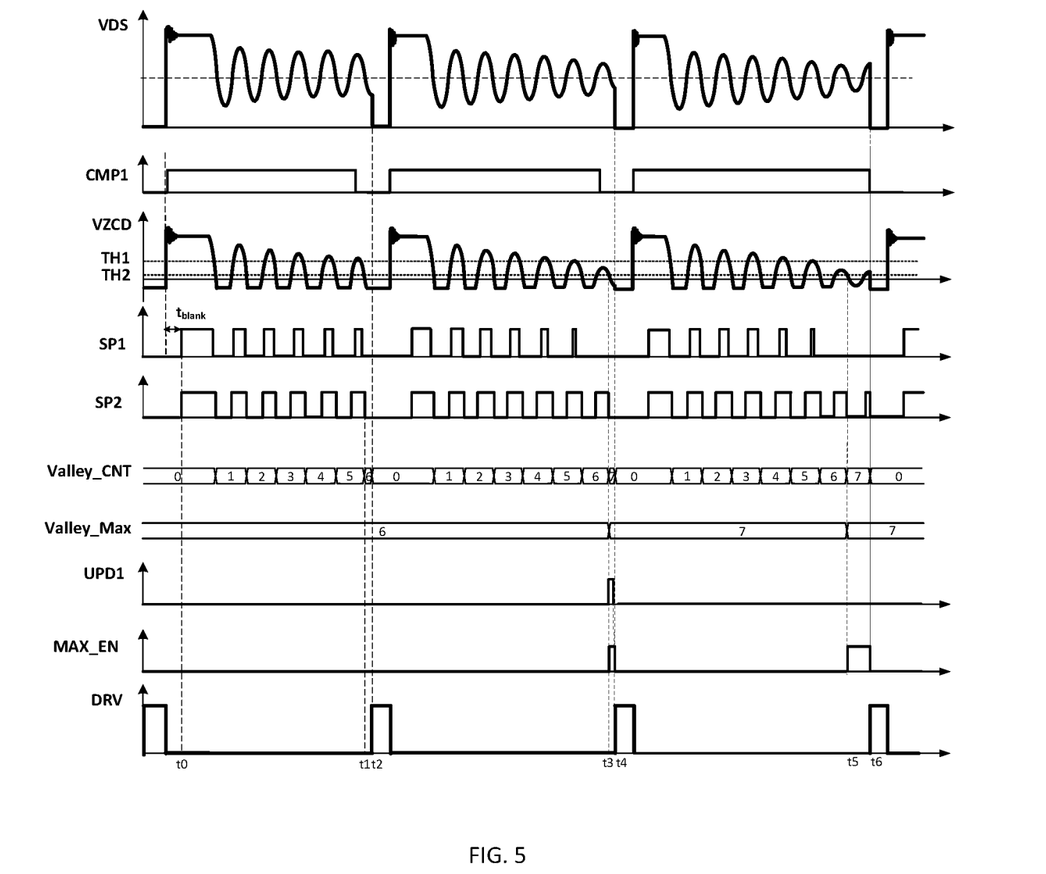
FIG. 5 is an operation waveform diagram of the switching power supply 100 in accordance with another embodiment of the present invention.

FIG. 5 is an operation waveform diagram of the switching power supply 100 in accordance with another embodiment of the present invention. As shown in FIG. 5, at time to, when the power switch M1 is turned off for a blanking time tblank, the comparison between the voltage sensing signal VZCD and the first threshold voltage TH1 and the comparison between the voltage sensing signal VZCD and the second threshold voltage TH2 are both enabled. Once the voltage sensing signal VZCD decreases to the first threshold voltage TH1, the first square wave signal SP1 provides a falling edge, and thus the number of the falling edges of the first square wave signal SP1 is the number of the pulses of the first pulse signal. Once the voltage sensing signal VZCD decreases to the second threshold voltage TH2, the second square wave signal SP2 provides a falling edge, and thus the number of the falling edges of the second square signal SP2 determines the number of the pulses of the second pulse signal.

As shown in FIG. 5, at time t1, the number of the falling edges of the first square wave signal SP1 and the number of the falling edges of the second square wave signal SP2 are equal. Accordingly, the number of the pulses of the first pulse signal is equal to the number of the pulses of the second pulse signal. The first determination signal S1 is disabled, and the updating indication signal UPD is disabled, the upper limit Valley_Max keeps unchanged and is not updated. In addition, since the number (i.e., Valley_CNT) of pulses of the second pulse signal at time t1 is equal to 5 and the upper limit Valley_Max is 6, the upper limit enable signal MAX_EN is disabled.

At time t2, the power switch M1 is turned on at the valley corresponding to the target locked valley number Valley_lock, and then a next switching cycle begins.

At time t3, the number of the falling edges of the second square wave signal SP2 is higher than the number of the falling edges of the first square wave signal SP1, that is, the number of the pulses of the second pulse signal is greater than the number of the pulses of the first pulse signal, and the number of the pulses of the second pulse signal is 7, which exceeds the current upper limit Valley_Max (e.g., 6) stored in the register, the first updating indication signal UPD1 is enabled, and the upper limit is updated to the number of the pulses of the second pulse signal, i.e., 7.

The falling edge of the first comparison signal CMP1 comes before the time t3, the power switch M1 is turned on at the valley corresponding to the upper limit Valley_Max, i.e., at the time t4. Subsequently, at time t5, in a new switching cycle, the number of the pulses of the second pulse signal is greater than the number of pulses of the first pulse signal, and the number of pulses of the second pulse signal is 7, the first updating indication signal UPD1 is disabled, the upper limit Valley_Max keeps 7 unchanged. At the time t6, the falling edge of the first comparison signal CMP1 comes after the number of the pulses of the second pulse signal reaches the upper limit Valley_Max. The power switch M1 is turned on when the falling edge of the first comparison signal CMP1, not waiting for the next valley. The conversion efficiency of the switching power supply can be improved.

Figure 6:
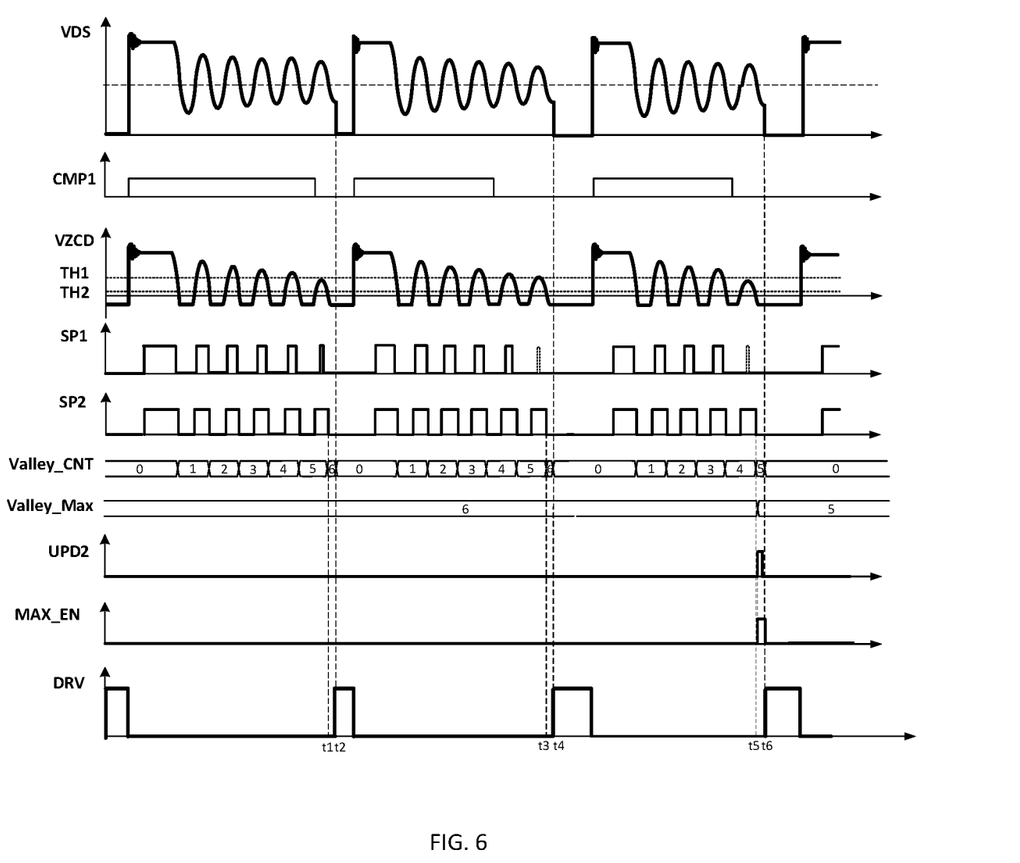
FIG. 6 is an operation waveform diagram of the switching power supply 100 in accordance with yet another embodiment of the present invention.

FIG. 6 is an operation waveform diagram of the switching power supply 100 in accordance with yet another embodiment of the present invention. As shown in FIG. 6, at time t1, the number of the falling edges of the first square wave signal SP1 is equal to the number of the falling edges of the second square wave signal SP2, and the first determination signal S1 is disabled, and thus the second updating indication signal UPD2 is disabled. The updating indication signal UPD is disabled, the upper limit Valley_Max keeps unchanged. The number of the pulses of the second pulse signal is 5, which is not greater than the upper limit Valley_Max, and the power switch M1 is turned on at the target locked valley number Valley_lock, as shown at the time t2.

At time t3, the number of the falling edges of the first square wave signal SP1 is less than the number of the pulses of the second square wave signal SP2. Therefore, the number of the pulses of the first pulse signal is less than the number of the pulses of the second pulse signal, and the first determination signal S1 is enabled. In addition, the number of the pulses of the second pulse signal is equal to the upper limit Valley_Max, the updating indication signal UPD is disabled, the upper limit enable signal MAX_EN is disabled. The power switch M1 is turned on at the valley corresponding to the upper limit Valley_Max, as shown at the time t4.

At time t5, the number of the falling edges of the first square wave signal SP1 is less than the number of the falling edges of the second square wave signal SP2, that is, the number of the pulses of the first pulse signal is less than the number of the pulses of the second pulse signal, the first determination signal S1 is enabled. In addition, the number of the pulses of the second pulse signal is 5, which is less than the valley limit Valley_Max, the second updating indication signal UPD2 is enabled, the upper limit Valley_Max is updated to the number of the pulses of the second pulse signal, i.e., 5. At time t6, the power switch M1 is turned on at the valley corresponding to the updated upper limit Valley_Max.

Figure 7:
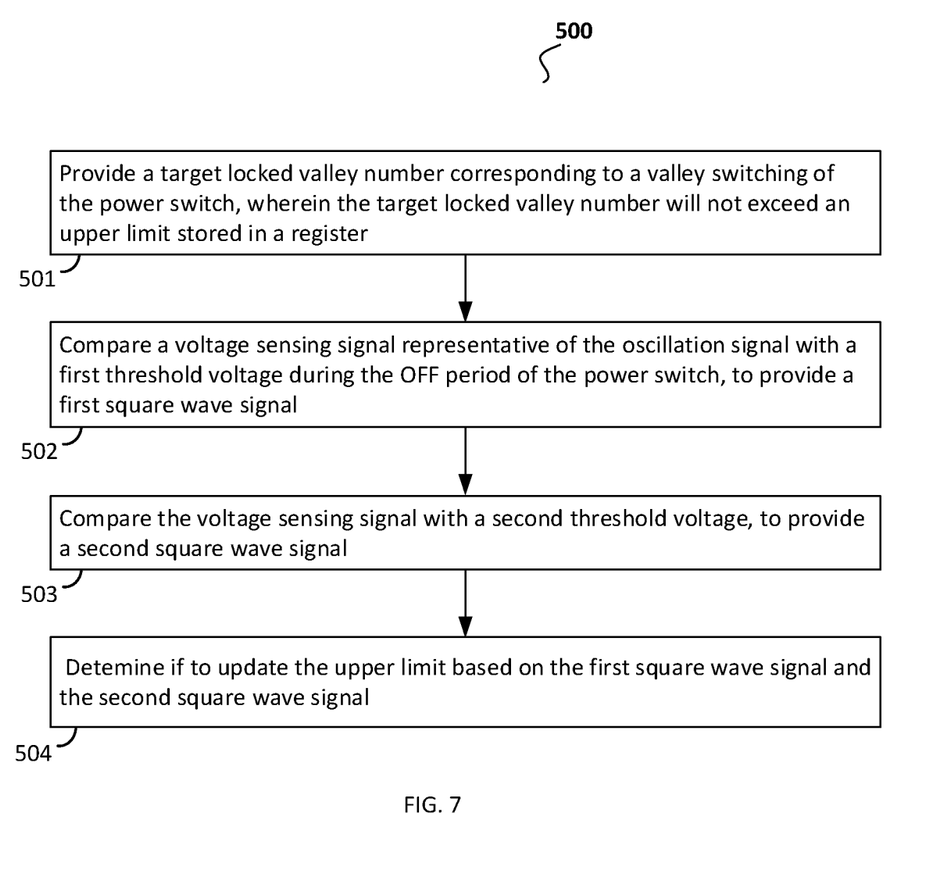
FIG. 7 is a flow diagram of a control method 500 for a switching power supply in accordance with an embodiment of the present invention.

FIG. 7 is a flow diagram of a control method 500 for a switching power supply in accordance with an embodiment of the present invention. The switching power supply has a power switch and an energy storage element coupled to the power switch. A winding voltage of the energy storage element oscillates to provide an oscillation signal having one or more valleys during an OFF period of the power switch. The control method 500 comprises steps 501~504.

At step 501, a target locked valley number is provided. The target locked valley number is corresponding to a valley switching of the power switch and will not exceed an upper limit stored in a register.

In one embodiment, the method of providing the target locked valley number comprises the following steps. An output feedback signal is provided based on an output signal (e.g., output voltage, output current or output power) of the switching power supply. A hysteresis feedback signal is generated based on the output feedback signal. The output feedback signal is compared with a ramp signal to provide a first comparison signal. The hysteresis feedback signal is compared with the ramp signal to provide a second comparison signal. And the target locked valley number is determined based on the first comparison signal, the second comparison signal, a valley pulse signal corresponding to the one or more valleys of the oscillation signal, and the current locked valley number.

At step 502, a voltage sensing signal representative of the oscillation signal is compared with a first threshold voltage during the OFF period of the power switch, to provide a first square wave signal.

At step 503, the voltage sensing signal is compared with a second threshold voltage during the OFF period of the power switch, to provide a second square wave signal. Wherein the second threshold voltage is less than the first threshold voltage.

At step 504, if to update the upper limit is determined based on the first square wave signal and the second square wave signal.

Figure 8:
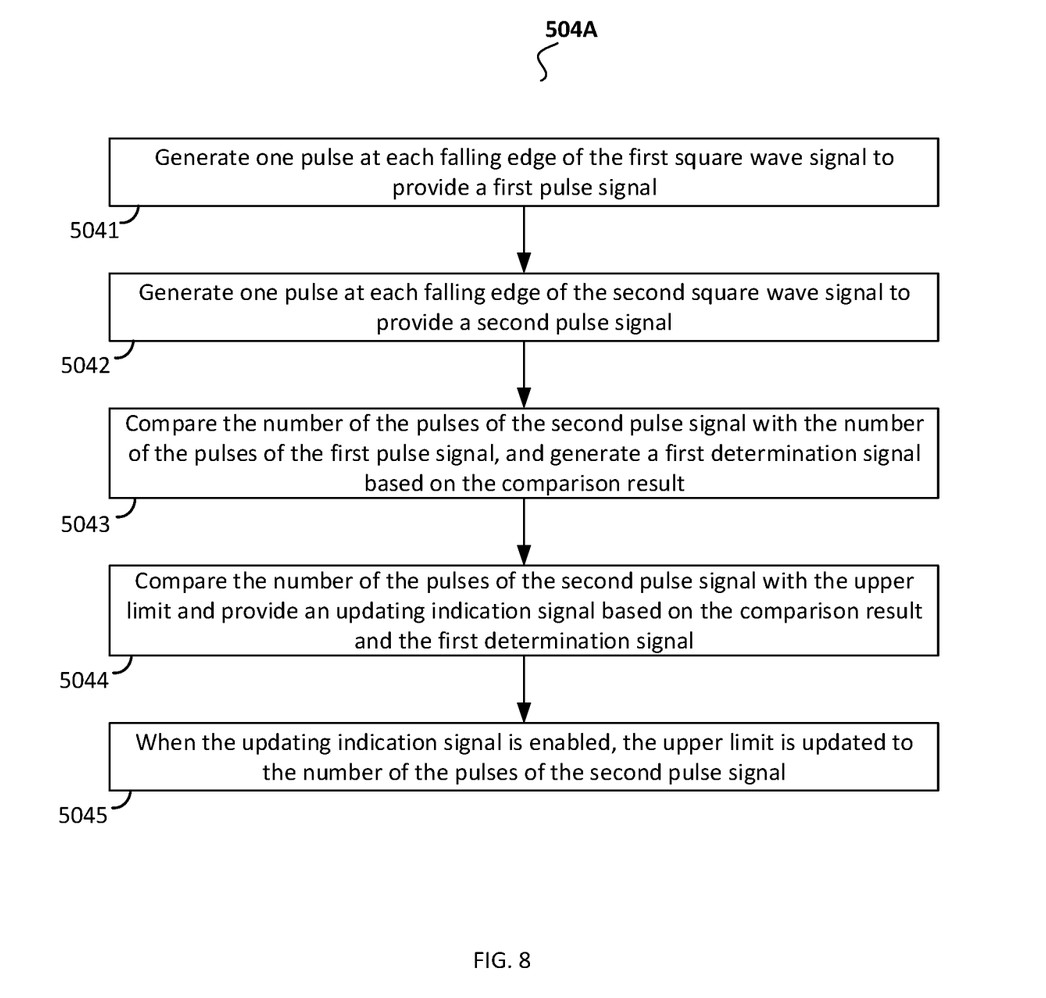
FIG. 8 is a flow diagram of a method 504A for updating the upper limit in accordance with an embodiment of the present invention.

FIG. 8 is a flow diagram of a method 504A for updating the upper limit in accordance with an embodiment of the present invention. As shown in FIG. 8, the method 504A comprises steps 5041~5045.

At step 5041, one pulse at each falling edge of the first square wave signal is generated, to provide a first pulse signal. At step 5042, one pulse at each falling edge of the second square wave signal is generated, to provide a second pulse signal.

At step 5043, the number of the pulses of the second pulse signal is compared with the number of the pulses of the first pulse signal, to generate a first determination signal. When the number of the pulses of the second pulse signal is greater than the number of the pulses of the first pulse signal, the first determination signal is enabled.

At the step 5044, the number of the pulses of the second pulse signal is compared with the upper limit currently stored in the register, an updating indication signal is generated based on the comparison result and first determination signal. And at step 5045, the upper limit is updated when the updating indication signal is enabled.

In detail, if the first determination signal is enabled, and the number of the pulses of the second pulse signal is greater than the upper limit currently stored in the register, the upper limit will be updated to the number of the pulses of the second pulse signal. if the first determination is enabled and the number of the pulses of the second pulse signal is less than the upper limit currently stored in the register, the upper limit is updated to the number of the pulses of the second pulse signal.

In a further embodiment, if the number of the pulses of the second pulse signal is less than the upper limit, the power switch is turned on at the valley corresponding to the target locked valley number. If the number of the pulses of the second pulse signal reaches the upper limit after the falling edge of the first comparison signal comes, the power switch is turned on at the valley corresponding to the upper limit. If the number of the pulses of the second pulse signal reaches the upper limit before the falling edge of the first comparison signal, the power switch is turned on when the falling edge of the first comparison signal comes.

In the above descriptions, the flyback converter is used as an example to explain the working principle of the present invention. However, persons skilled in the art can recognize that it is not intended to limit the invention. The present invention may be applied to any other suitable switching power supplies.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a switching power supply having a power switch and an energy storage element coupled to the power switch, a winding voltage of the energy storage element oscillates to provide an oscillation signal having one or more valleys during an OFF period of the power switch, the controller comprising:
   a target valley number generator configured to provide a target locked valley number corresponding to a valley switching of the power switch, wherein the target locked valley number will not exceed an upper limit stored in a register;
   a first comparison circuit configured to compare a voltage sensing signal representative of the oscillation signal with a first threshold voltage during the OFF period of the power switch to provide a first square wave signal;
   a second comparison circuit configured to compare the voltage sensing signal with a second threshold voltage during the OFF period of the power switch to provide a second square wave signal, wherein the second threshold voltage is less than the first threshold voltage; and
   an upper limit updating circuit configured to determine if to update the upper limit based on the first square wave signal and the second square wave signal.

2. The controller of claim 1, wherein the upper limit updating circuit comprising:
   a first falling-edge trigger circuit configured to generate one pulse at each falling edge of the first square wave signal to provide a first pulse signal;
   a second falling-edge trigger circuit configured to generate one pulse at each falling edge of the second square wave signal to provide a second pulse signal;
   a first determination circuit configured to compare the number of pulses of the second pulse signal with the number of pulses of the first pulse signal and to generate a first determination signal; and
   a second determination circuit configured to compare the number of pulses of the second pulse signal and the upper limit currently stored in the register, and to provide an updating indication signal based on the comparison and first determination signal, and the upper limit is updated when the updating indication signal is enabled.

3. The controller of claim 2, wherein the first determination signal is enabled when the number of the pulses of the second pulse signal is greater than the number of the pulses of the first pulse signal.

4. The controller of claim 3, wherein when the first determination signal is enabled and the number of the pulses of the second pulse signal is not equal to the upper limit currently stored in the register, the upper limit is updated to be the number of the pulses of the second pulse signal.

5. The controller of claim 4, wherein the target valley number generator comprises:
   a hysteresis feedback circuit configured to receive an output feedback signal indicative of an output signal of the switching power supply and to generate a hysteresis feedback signal based on the output feedback signal;
   a third comparison circuit configured to compare the output feedback signal and a ramp signal to generate a first comparison signal;
   a fourth comparison circuit configured to compare the hysteresis feedback signal and the ramp signal to provide a second comparison signal; and
   a target valley determination circuit configured to determine the target locked valley number based on a valley pulse signal corresponding to the one or more valleys of the oscillation signal, the first comparison signal, the second comparison signal and the current locked valley number.

6. The controller of claim 5, further comprises a turning-on control circuit configured to provide a turning-on control signal for controlling the turning-on of the power switch.

7. The controller of claim 6, wherein:
if the number of the pulses of the second pulse signal is less than the upper limit, the power switch is turned on at the valley corresponding to the target locked valley number;
if the number of pulses of the second pulse signal is not less than the upper limit after a falling-edge of the first comparison signal comes, the power switch is turned on at the valley corresponding to the upper limit; and
if the number of pulses of the second pulse signal is not less than the upper limit before the falling-edge of the first comparison signal comes, the power switch is turned on when the falling-edge of the first comparison signal comes.

8. A switching power supply, comprising:
a power switch;
an energy storage element coupled to the power switch, during an OFF period of the power switch, a winding voltage of the energy storage element oscillates to provide an oscillation signal having one or more valleys; and
a controller, comprising:
    a target valley number generator configured to provide a target locked valley number corresponding to a valley switching of the power switch, wherein the target locked valley number will not exceed an upper limit stored in a register;
    a first comparison circuit configured to compare a voltage sensing signal representative of the oscillation signal with a first threshold voltage during the OFF period of the power switch, to provide a first square wave signal;
    a second comparison circuit configured to compare the voltage sensing signal with a second threshold voltage during the OFF period of the power switch, to provide a second square wave signal, wherein the second threshold voltage is less than the first threshold voltage; and
    an upper limit updating circuit configured to determine if to update the upper limit based on the first square wave signal and the second square wave signal.

9. The switching power supply of claim 8, further comprises:
    a first falling-edge trigger circuit configured to generate one pulse at each falling edge of the first square wave signal to provide a first pulse signal;
    a second falling-edge trigger circuit configured to generate one pulse at each falling edge of the second square wave signal to provide a second pulse signal;
    a first determination circuit configured to compare the number of pulses of the second pulse signal with the number of pulses of the first pulse signal, to generate a first determination signal; and
    a second determination circuit configured to compare the number of pulses of the second pulse signal and the upper limit currently stored in the register, and to provide an updating indication signal based on the comparison and first determination signal, and the upper limit is updated when the updating indication signal is enabled.

10. The switching power supply of claim 9, wherein the first determination signal is enabled when the number of pulses of the second pulse signal is greater than the number of pulses of the first pulse signal.

11. The switching power supply of claim 10, wherein when the first determination signal is enabled and the number of pulses of the second pulse signal is not equal to the upper limit currently stored in the register, the upper limit is updated to be the number of pulses of the second pulse signal.

12. The switching power supply of claim 11, wherein the target valley number generator comprises:
    a hysteresis feedback circuit configured to receive an output feedback signal indicative of an output signal of the switching power supply and to generate a hysteresis feedback signal based on the output feedback signal;
    a third comparison circuit configured to compare the output feedback signal and a ramp signal to generate a first comparison signal;
    a fourth comparison circuit configured to compare the hysteresis feedback signal and the ramp signal to provide a second comparison signal; and
    a target valley determination circuit configured to determine the target locked valley number based on a valley pulse signal corresponding to the one or more valleys of the oscillation signal, the first comparison signal and the second comparison signal and current locked valley number.

13. The switching power supply of claim 12, further comprises a turning-on control circuit configured to provide a turning-on control signal for controlling the turning-on of the power switch.

14. The switching power supply of claim 13, wherein:
if the number of pulses of the second pulse signal is less than the upper limit, the power switch is turned on at the valley corresponding to the target locked valley number;
if the number of pulses of the second pulse signal is not less than the upper limit after a falling-edge of the first comparison signal comes, the power switch is turned on at the valley corresponding to the upper limit; and
if the number of pulses of the second pulse signal is not less than the upper limit before the falling-edge of the first comparison signal comes, the power switch is turned on when the falling-edge of the first comparison signal comes.

15. A control method used in a switching power supply having a power switch and an energy storage element coupled to the power switch, a winding voltage of the energy storage element oscillates to provide an oscillation signal having one or more valleys during an OFF period of the power switch, the control method comprising:
    providing a target locked valley number corresponding to a valley switching of the power switch, wherein the target locked valley number will not exceed an upper limit stored in a register;
    comparing a voltage sensing signal representative of the oscillation signal with a first threshold voltage during the OFF period of the power switch, to provide a first square wave signal;
    comparing the voltage sensing signal with a second threshold voltage during the OFF period of the power switch, to provide a second square wave signal, wherein the second threshold voltage is less than the first threshold voltage; and
    determining if to update the upper limit based on the first square wave signal and the second square wave signal.

16. The control method of claim 15, further comprising:
generating one pulse at each falling edge of the first square wave signal, to provide a first pulse signal;
generate one pulse at each falling edge of the second square wave signal to provide a second pulse signal;
comparing the number of pulses of the second pulse signal with the number of pulses of the first pulse signal, to generate a first determination signal; and
comparing the number of pulses of the second pulse signal and the upper limit currently stored in the register, to provide an updating indication signal based on the comparison and first determination signal, and updating the upper limit when the updating indication signal is enabled.

17. The control method of claim 16, wherein:
the first determination signal is enabled when the number of pulses of the second pulse signal is greater than the number of pulses of the first pulse signal.

18. The control method of claim 17, wherein:
when the first determination signal is enabled and the number of pulses of the second pulse signal is not equal to the upper limit currently stored in the register, the upper limit is updated to be the number of pulses of the second pulse signal.

19. The control method of claim 18, wherein providing a target locked valley number comprising:
providing an output feedback signal indicative of an output signal of the switching power supply;
generating a hysteresis feedback signal based on the output feedback signal;
comparing the output feedback signal and a ramp signal, to generate a first comparison signal;
comparing the hysteresis feedback signal and the ramp signal, to provide a second comparison signal; and
determining the target locked valley number based on a valley pulse signal corresponding to the one or more valleys of the oscillation signal, the first comparison signal and the second comparison signal and the current locked valley number.

20. The control method of claim 19, wherein
if the number of pulses of the second pulse signal is less than the upper limit, the power switch is turned on at the valley corresponding to the target locked valley number;
if the number of pulses of the second pulse signal is not less than the upper limit after a falling-edge of the first comparison signal comes, the power switch is turned on at the valley corresponding to the upper limit; and
if the number of pulses of the second pulse signal is not less than the upper limit before the falling-edge of the first comparison signal comes, the power switch is turned on when the falling-edge of the first comparison signal comes.

* * * * *